J. P. GLOVER.
AERIAL MACHINE.
APPLICATION FILED DEC. 2, 1911.

1,044,375.

Patented Nov. 12, 1912.
2 SHEETS—SHEET 1.

WITNESSES

INVENTOR

J. P. GLOVER.
AERIAL MACHINE.
APPLICATION FILED DEC. 2, 1911.

1,044,375.

Patented Nov. 12, 1912.
2 SHEETS—SHEET 2.

WITNESSES

INVENTOR

UNITED STATES PATENT OFFICE.

JOHN PETER GLOVER, OF LEEDS, ENGLAND.

AERIAL MACHINE.

1,044,375.

Specification of Letters Patent.　　Patented Nov. 12, 1912.

Application filed December 2, 1911.　Serial No. 663,497.

*To all whom it may concern:*

Be it known that I, JOHN PETER GLOVER, a subject of the King of Great Britain, residing at 9 Sholebroke Mount, Leeds, Yorkshire, England, have invented certain new and useful Improvements in Aerial Machines; and I do hereby declare the following to be a full, clear, and exact description of the invention, such as will enable others skilled in the art to which it appertains to make and use the same.

The present invention relates to aerial machines in which opposed sets of oppositely rotating feathering blades are arranged to rotate about parallel axes so that the blades in their rotation compress the air beneath them and so raise the flying machine or the like to which they are secured.

One object of the present invention is to arrange the blades so that in feathering they will produce a greater area of compression beneath them.

Another object is to prevent the slip or escape of compressed air up between the oppositely rotating sets of blades.

Another object is to at the same time produce a vacuum or suction effect above the sets of blades which will naturally increase the raising effect produced by the machine.

Another object is to provide means for deflecting a portion of the downward current of air produced by the blades so as to provide means for propelling the device forward.

Another object of the invention lies in providing an air brake for regulating the downward thrust produced by the blades to enable the device to hover in the air.

Figure 1:
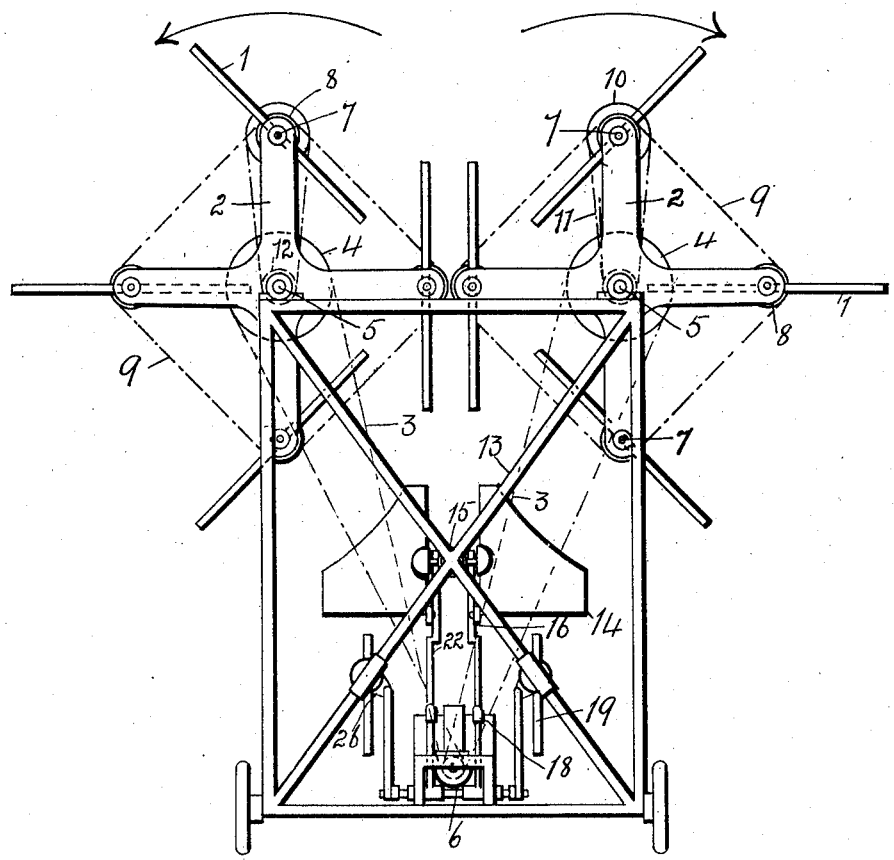
Figure 2:
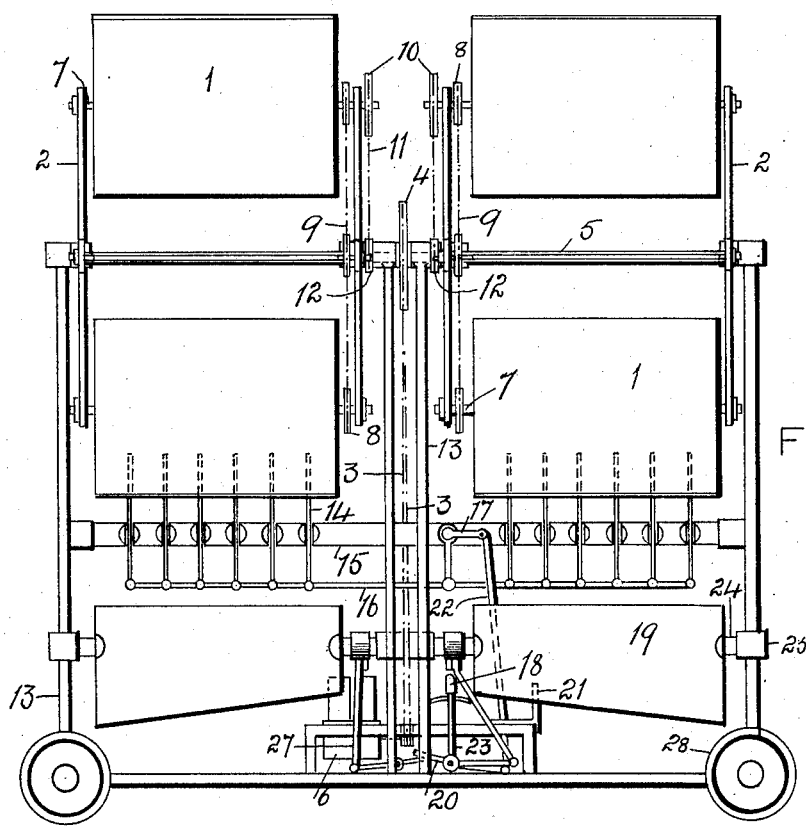
Figure 3:
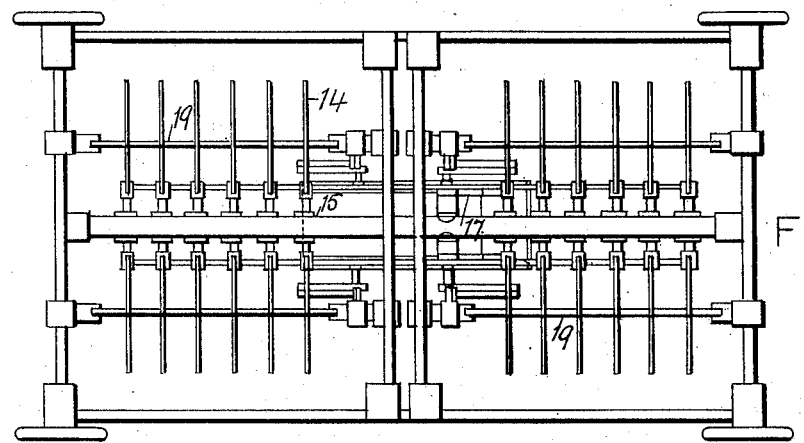

In the accompanying drawings Figure 1 is an end view of the device constructed in accordance with the present invention shown more or less diagrammatically. Fig. 2 is a side view of Fig. 1 while Fig. 3 is a plan view of Fig. 1 with the rotating blade devices removed.

As shown in the drawings the rotating blades are indicated by the numeral 1. They are mounted on frames 2 having arms which frames are carried by parallel shafts 5 carrying sprocket wheels 4 connected to a motor 6 mounted on the frame 13 of the machine. The shafts 5 are mounted as near to one another as is possible having regard to the length of the arms of the frames 2 and the depth of the blades 1. The blades 1 are mounted in the arms of the frames 2 by means of shafts 7 which shafts are all located in their respective frames at an equal distance from the shaft 5 to which they are secured. Each of the shafts 7 carries a sprocket wheel 8, and the sprocket wheels 8 and all the blades in each set are interconnected by a chain 9. One of the shafts 7 of each set of blades 1 carries a further sprocket wheel 10 which is connected by means of a chain 11 with a stationary sprocket wheel 12 fixed to the framework 13 of the machine which sprocket wheel 12 is of exactly half the diameter of the sprocket wheel 10. The chains 3 connecting the sprocket wheels 4 to the motor 6 are arranged so that that on the left hand side is crossed while that on the right hand side is open so that the two frames carrying the blades will rotate in opposite directions, the parts momentarily at the lowermost point always approaching each other. The shafts 5 are mounted in bearings on the frame 13 and in the preferred arrangement as shown each shaft carries two sets of blades lengthwise making four sets of blades in all. On diagonal members of the frame 13 there is mounted a beam 15 to which are hinged on each side louvers or deflectors 14 comprising vertically disposed vanes. The deflectors on each side are connected to rods 16. These rods 16 are each in turn connected to a bell crank lever 17 which is mounted on the beam 15. Each bell crank lever is connected to a link 22 each of which is in turn hinged to a bell crank 23 carrying a handle 18 so that the two handles 18 separately and individually control the sets of deflectors on each side of the beam 15. Below the beam 15 is mounted the air brake. This consists of hinged blades 19 which are mounted on shafts 24 carried in bearings 25 mounted on the main frame 13. The shafts 24 on each side are each provided with cranks 26. These cranks 26 on each side are connected by means of links 27 to interconnected pedals 20. The pilot's seat is shown at 21. The machine is provided with wheels 28 for transport over the ground.

The action of the device is as follows:—
On the engine being started the frames 2 on each side of the machine are rotated in opposite directions so that their momentarily outermost arms descend. The rotation of these frames 2 will owing to the chain 11 connecting the sprocket wheels 10 and the stationary sprocket wheel 12 cause the blades themselves to rotate in a direction opposite to that in which the frame carrying them rotates and owing to the sprocket wheel 10 being twice the size of the sprocket wheel 12 the speed of rotation of the blades will be exactly half the speed of rotation of the frames carrying the blades. As all the blades 1 in each set are interconnected by the chain 9 and sprocket wheels 8 all the blades will rotate synchronously. As shown in the drawings more particularly in Fig. 1 the blades when at their outermost position are horizontal. From the foregoing arrangement of sprocket wheels and chains it will be obvious that when at their lowermost position these blades will be inclined at an angle of 45 degrees to the vertical with their upper edge leading. When at their innermost position the blades will be vertical and when at their uppermost position the blades will again be inclined at an angle of 45 degrees with their upper edge leading. Owing to the blades at their lowermost position coming into the position above described the corresponding blades of opposing sets in approaching will still force the air they come in contact with downward and form an area of compression below the blades for practically the whole of their travel till they reach the innermost position. As the two blades in question approach their edges will come very closely together and so prevent any slip of air up between opposed sets. As the blades for opposing sets in moving from their innermost position become gradually inclined they will tend to draw away the air from above the machine and so form a partial vacuum and produce a suction effect which will assist in raising the machine. When it is desired to go forward the pilot moves forward the handles 18 bringing the deflectors or louvers 14 into an inclined position and deflecting the current of air out backward to a certain extent and if this action be taken after the machine has risen somewhat the machine will be propelled forward. The steering can obviously be accomplished by moving one of the handles 18 forward more than the other. When it is desired to hover in the air and remain stationary the aviator presses on the treadle devices 20 and so brakes the downward current of air from the blades sufficiently to prevent the blades from raising the machine any farther but not to a sufficient extent to prevent the blades sustaining the machine. Obviously by moving the treadle devices 20 to different extents a balancing effect can be produced.

In the drawings each set of blades is shown to be formed of four blades. If desired there can be three blades or other number of blades.

I declare that what I claim is:

1. In an aerial machine having opposed rotatable sets of feathering blades, means for rotating the blades in sets about an axis common to the blades forming each set and means for rotating each blade about its own axis in a direction counter to that in which the sets of blades are rotated and at a speed equal to half the speed at which the sets of blades are rotated, deflectors comprising a plurality of vertically disposed vanes hingedly mounted in the framework below the feathering blades, and means for inclining said deflectors for forward travel.

2. In an aerial machine having opposed rotatable sets of feathering blades, arranged about horizontal axes, deflectors beneath said sets of feathering blades, means for inclining said deflectors for forward propulsion and means for braking the downward current of air produced by the rotation of said sets of feathering blades.

3. In an aerial machine, a framework, a pair of horizontal rotatable shafts mounted at the top of said framework, frames mounted upon said shafts, means for rotating said shafts in opposite directions so that the momentarily lowermost points of said frames approach each other, feathering blades mounted on said frames, normally vertical deflectors arranged beneath said blades, means for inclining said deflectors, normally vertical plates also mounted in said framework below said blades and means for turning said blades into a more or less horizontal position substantially as described.

4. In an aerial machine, a framework, a pair of horizontal rotatable shafts mounted at the top of said framework, frames mounted upon said shafts, means for rotating said shafts in opposite directions so that the momentarily lowermost points of said frames approach each other, normally vertical plates mounted in said framework below said blades and means for turning said blades into a more or less horizontal position substantially as described.

In testimony whereof, I affix my signature, in presence of two witnesses.

JOHN PETER GLOVER.

Witnesses:
 HUBERT PUMPHREY,
 CHARLES HIBBERT.